United States Patent
Suzuki (12)

(10) Patent No.: US 6,892,541 B2
(45) Date of Patent: May 17, 2005

(54) VEHICLE CONTROL DEVICE AND CONTROL METHOD OF THE SAME

(75) Inventor: Naoto Suzuki, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/367,717

(22) Filed: Feb. 19, 2003

(65) Prior Publication Data

US 2003/0172643 A1 Sep. 18, 2003

(30) Foreign Application Priority Data

Mar. 12, 2002 (JP) ......................................... 2002-067256

(51) Int. Cl.⁷ ........................... B60L 11/00; B60K 6/04; B60K 11/00
(52) U.S. Cl. ............................. 60/706; 60/711; 60/716; 123/142.5 R; 123/142.5 E; 180/65.2; 180/65.4
(58) Field of Search ........................... 60/706, 711, 716, 60/300, 303, 284; 123/142.5 R, 142.5 E; 180/65.2, 65.3, 65.4

(56) References Cited

U.S. PATENT DOCUMENTS

| 5,255,733 A | * 10/1993 | King ..................... 123/142.5 R |
| 5,323,868 A | * 6/1994 | Kawashima ................ 180/65.4 |
| 5,345,761 A | * 9/1994 | King et al. ................. 180/65.3 |
| 5,531,285 A | * 7/1996 | Green ........................ 180/65.2 |
| 5,785,137 A | 7/1998 | Reuyl ........................ 180/65.2 |
| 6,253,866 B1 | * 7/2001 | Kojima ...................... 180/65.2 |
| 6,394,209 B1 | 5/2002 | Goehring et al. ........... 180/65.4 |
| 6,424,053 B1 | * 7/2002 | Wakashiro et al. ........ 180/65.2 |
| 6,427,793 B1 | * 8/2002 | Hanada et al. ............. 180/65.2 |
| 6,459,166 B2 | * 10/2002 | Yanase et al. ............. 180/65.2 |
| 6,619,034 B1 | * 9/2003 | Hilbert ........................ 60/284 |

FOREIGN PATENT DOCUMENTS

| DE | 692 01 094 T2 | 5/1995 |
| DE | 195 32 135 A1 | 3/1997 |
| DE | 694 16 014 T2 | 3/1997 |
| EP | 0 511 654 A2 | 4/1992 |
| FR | 2 753 143 A1 | 8/1997 |
| JP | 04-331402 A | 11/1992 |
| JP | 07-71236 A | 3/1995 |
| JP | 11-210448 A | 8/1999 |
| JP | A 2000-324615 | 11/2000 |
| JP | 2000-324615 | 11/2000 |
| JP | A 2001-098941 | 4/2001 |

* cited by examiner

Primary Examiner—Sheldon J Richter
(74) Attorney, Agent, or Firm—Oliff & Berridge PLC (57) ABSTRACT

A vehicle control device is installed in a hybrid vehicle which can run by a driving force of at least one of an engine and a motor, and charges a battery by driving the engine when an amount of electric power stored in a battery which supplies the electric power to a motor becomes equal to or smaller than a predetermined lower limit. The vehicle control device preheats the engine, a catalyst and the like when an amount of the electric power stored in the battery becomes equal to a value which is set as an amount of stored electric power that is larger than the lower limit. Thus, since the engine and the like have already been warmed when the engine is started, deterioration of emission can be prevented, and the vehicle can run properly.

16 Claims, 5 Drawing Sheets

VEHICLE CONTROL DEVICE AND CONTROL METHOD OF THE SAME

INCORPORATION BY REFERENCE

The disclosure of Japanese Patent Application No. 2002-067256 filed on Mar. 12, 2002 including the specification, drawings and abstract are incorporated herein by reference in its entirety.

BACKGROUND OF THE INVENTION

1. Field of the Invention

The invention relates to a vehicle control device which is mounted in a hybrid vehicle and which controls the vehicle.

2. Description of the Related Art

As a device which controls a hybrid vehicle, as disclosed in Japanese Patent Laid-Open Publication No. 2000-324615, a device installed in a hybrid vehicle which includes an engine and a motor has been known. The device controls driving of the engine and the motor so as to run the vehicle by a driving force of at least one of the engine and the motor. In a device of this type, generally, an amount of electric power stored in a battery is maintained at a predetermined amount by controlling an amount of the electric power stored in the battery which supplies the electric power to the motor as well. For example, when the amount of the electric power stored in the battery becomes equal to or smaller than the predetermined amount, the device forcibly drives the engine to generate electric power using the driving force of the engine, and charges the battery with the generated electric power so as to restore the amount of the electric power stored in the battery.

However, when the engine which has been stopped is immediately started so as to charge the battery, trouble such as deterioration of emission may be caused since the engine has not been warmed. Accordingly, it is preferrable to preheat the engine, a catalyst and the like before the engine is started. However, when it takes a long time until the engine is started due to preheating the engine, the catalyst and the like, the amount of electric power stored in the battery may become below the lower limit for use, which makes it impossible for the vehicle to run.

SUMMARY OF THE INVENTION

Accordingly, the invention is made in order to solve the above-mentioned problem. It is an object of the invention to provide a vehicle control device which enables a vehicle to run properly when an amount of electric power stored in a battery is decreased.

A vehicle control device according to an aspect of the invention which is installed in a vehicle that includes an internal combustion engine and an electric motor and that runs by a driving force of at least one of the internal combustion engine and the electric motor includes an electric power storing portion that supplies electric power to the electric motor, a control portion that charges the electric power storing portion by starting the internal combustion engine when an amount of the electric power stored in the battery becomes below a lower limit, and a heating portion that preheats the internal combustion engine when a variation amount per unit time in the electric power stored in the battery becomes equal to or lower than a set value that is set as an amount of the electric power larger than the lower limit, or when the variation amount per unit time in the electric power stored in the electric power storing portion becomes equal to or larger than the preset set value. Also, a control method thereof includes a heating step of preheating the internal combustion engine when the amount of the electric power stored in the electric power storing portion becomes equal to the set value that is set as an amount of stored electric power larger than the lower limit, or when the variation amount per unit time in the electric power stored in the electric power storing portion becomes equal to or larger than the preset set value, and a charging step of charging the electric power storing portion by starting the internal combustion engine after the internal combustion engine is preheated in the heating step.

According to the vehicle control device having the above-mentioned configuration and the control method thereof, the engine is preheated before electric power storing means is charged by driving the internal combustion engine. Accordingly, the engine has already been warmed when the internal combustion engine is started so as to charge the electric power storing means, which prevents the occurrence of trouble such as deterioration of emission. Also, when electric power is generated by driving the internal combustion engine, it is not necessary to delay driving the internal combustion engine for warming the engine. Therefore, the electric power storing means can be promptly charged as required. Also, a state in which the vehicle becomes unable to run because the electric power storing means is excessively discharged can be avoided. Thus, the vehicle can run properly when the amount of the electric power charged in the battery is decreased.

DETAILED DESCRIPTION OF PREFERRED EMBODIMENTS

Hereafter, embodiments of the invention will be explained in detail with reference to accompanying drawings. Note that the same reference numerals are assigned to the same elements, and overlapping explanation is omitted when explaining the drawings.

(First Embodiment)

Figure 1:
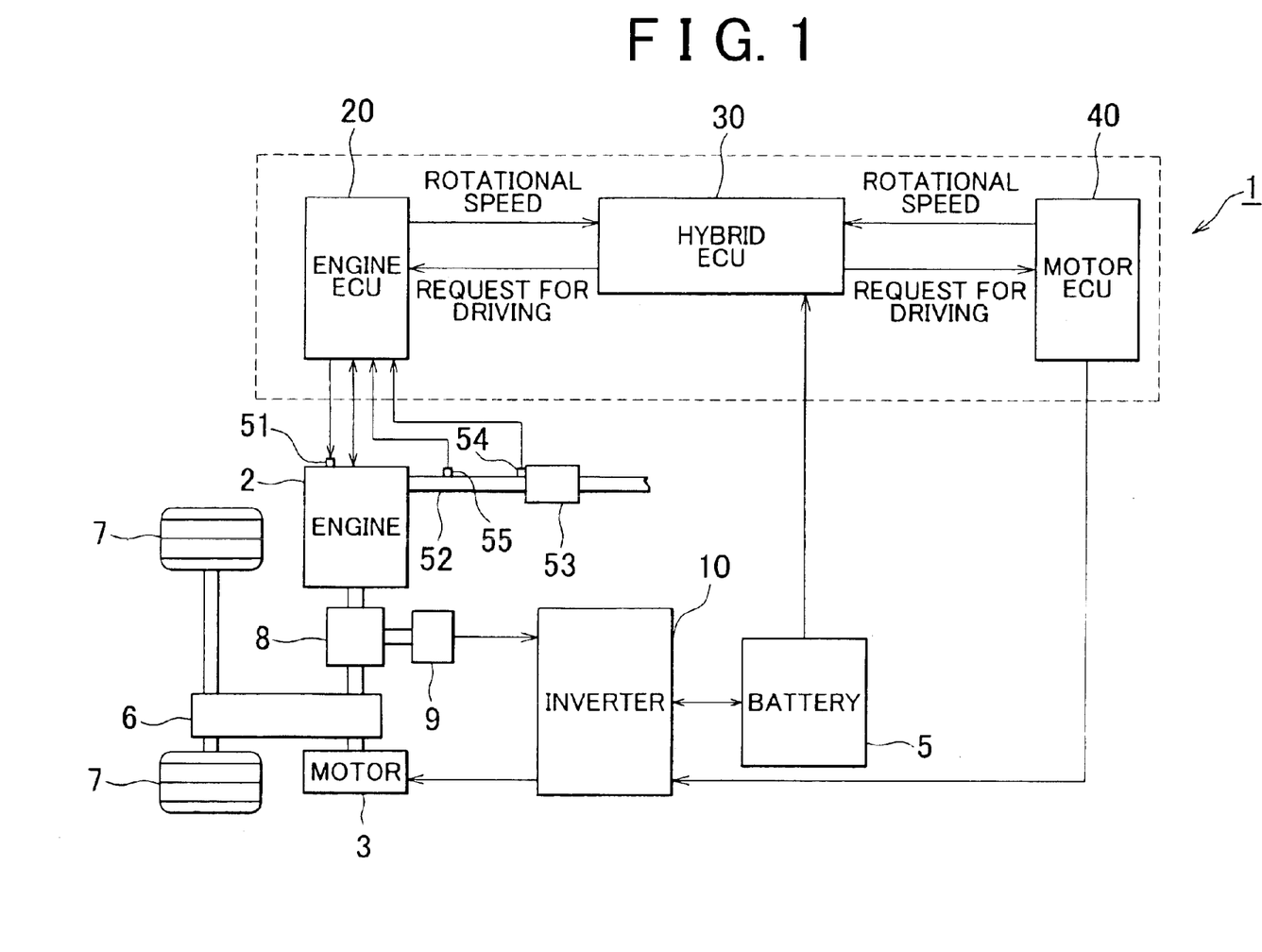
FIG. 1 is a block diagram of a vehicle control device according to a first embodiment of the invention.

FIG. 1 is a block diagram schematically showing a vehicle control device according to a first embodiment.

As shown in FIG. 1, a vehicle control device 1 according to the embodiment is installed in a hybrid vehicle which includes an engine 2 and a motor 3, and which can run by driving the engine 2 or the motor 3. The motor 3 is an electric motor which is driven by electric power supplied from a battery 5. The motor 3 is mechanically connected to a driving wheel 7 through a reduction gear 6 so as to transmit a driving force to the driving wheel 7. The engine 2 is mechanically connected to the driving wheel 7 through a power distribution mechanism 8 and the reduction gear 6 so as to transmit a driving force to the driving wheel 7. As the power distribution mechanism 8, for example, a planetary gear mechanism is used.

A generator 9 is connected to the power distribution mechanism 8. The generator 9 functions as electric power generating means for generating electric power using the driving force from the engine 2 or the driving wheel 7. The generator 9 and the motor 3 are electrically connected to the battery 5 through an inverter 10. The alternating current power which is generated by the generator 9 is converted to a direct current power by the inverter 10 such that the battery 5 as the electric power storing portion is charged with the above-mentioned electric power. At this time, the battery 5 functions as the electric power storing means for storing the electric power generated by the generator 9. The direct current power from the battery 5 is converted to an alternating current by the inverter 10 and is supplied to the motor 3. Then, the motor 3 is driven by the supplied alternating current power.

A hybrid vehicle in which the vehicle control device 1 is mounted is not limited to the hybrid vehicle of the above mentioned type, and may be a hybrid vehicle including a motor generator which functions as both a motor and a generator as long as the vehicle can run by a driving force of at least one of an internal combustion engine and an electric motor. Also, the hybrid vehicle in which the vehicle control device 1 is mounted is not limited to one type. The hybrid vehicle may be any type, such as a series type in which a wheel is driven by a motor and an engine is used as a source of supplying electric power to a generator, a parallel type in which a wheel can be driven by both of an engine and a motor or the like.

An engine ECU 20, a hybrid ECU 80 and a motor ECU 40 are provided in the vehicle control device 1. The engine ECU 20 is a controller which outputs a throttle opening command signal of the engine 2 according to a driving request from a hybrid ECU 30. The motor ECU 40 is a controller which outputs a driving signal of the motor 3 through the inverter 10 according to a driving request from the hybrid ECU 30. The motor ECU 40 is connected to the inverter 10.

The hybrid ECU 30 calculates power required by a driver based on an accelerator opening, a vehicle speed and the like so as to calculate electric power which is required to be generated when the amount of charged electric power in the battery 5 (SOC: State of Charge) is decreased. Then, the hybrid ECU 30 calculates total power based on the power required by the driver and the electric power which is required to be generated. Then, the hybrid ECU 30 performs a computation on the required engine output, motor torque and the like based on the total power, outputs a driving request signal to the engine ECU 20 and the motor ECU 40 so as to control driving of the engine 2 and the motor 3.

Also, the hybrid ECU 30 functions as a storage controller for maintaining the amount of charged electric power (the amount of stored electric power) in the battery at a predetermined target value. The hybrid ECU 30 performs storage control such that the amount of the electric power stored in the battery 5 whose lower limit and upper limit are preset does not become below the lower limit and also does not exceed the upper limit.

In FIG. 1, the engine ECU20, the hybrid ECU30 and the motor ECU 40 are separately provided. However, all of or part of the engine ECU20, the hybrid ECU30 and the motor ECU40 may be integrally configured.

A heater 51 is provided in the engine 2. The heater 51, which is a heating portion, is heating means for heating the engine 2. As the heater 51, an electric heater which is mounted in the engine 2, a hot-water heater which increases a temperature of a coolant or the like is used.

A catalyst 53 is provided in an exhaust passage 52 of the engine 2. The catalyst 53 purifies a toxic element contained in the exhaust gas which is exhausted from the engine 2. Also, a heater 54, which is a heating portion, is provided in the catalyst 53. The heater 54 is heating means for heating the catalyst 53. As the heater 54, any heater may be used as long as the heater can heat the catalyst 53.

Also, an oxygen sensor 55 is provided in the exhaust passage 52 of the engine 2. The oxygen sensor 55 is a sensor which detects an oxygen concentration in the exhaust gas, and includes a heater for heating the sensor.

Next, an operation of the vehicle control device according to the embodiment will be explained.

Figure 2:
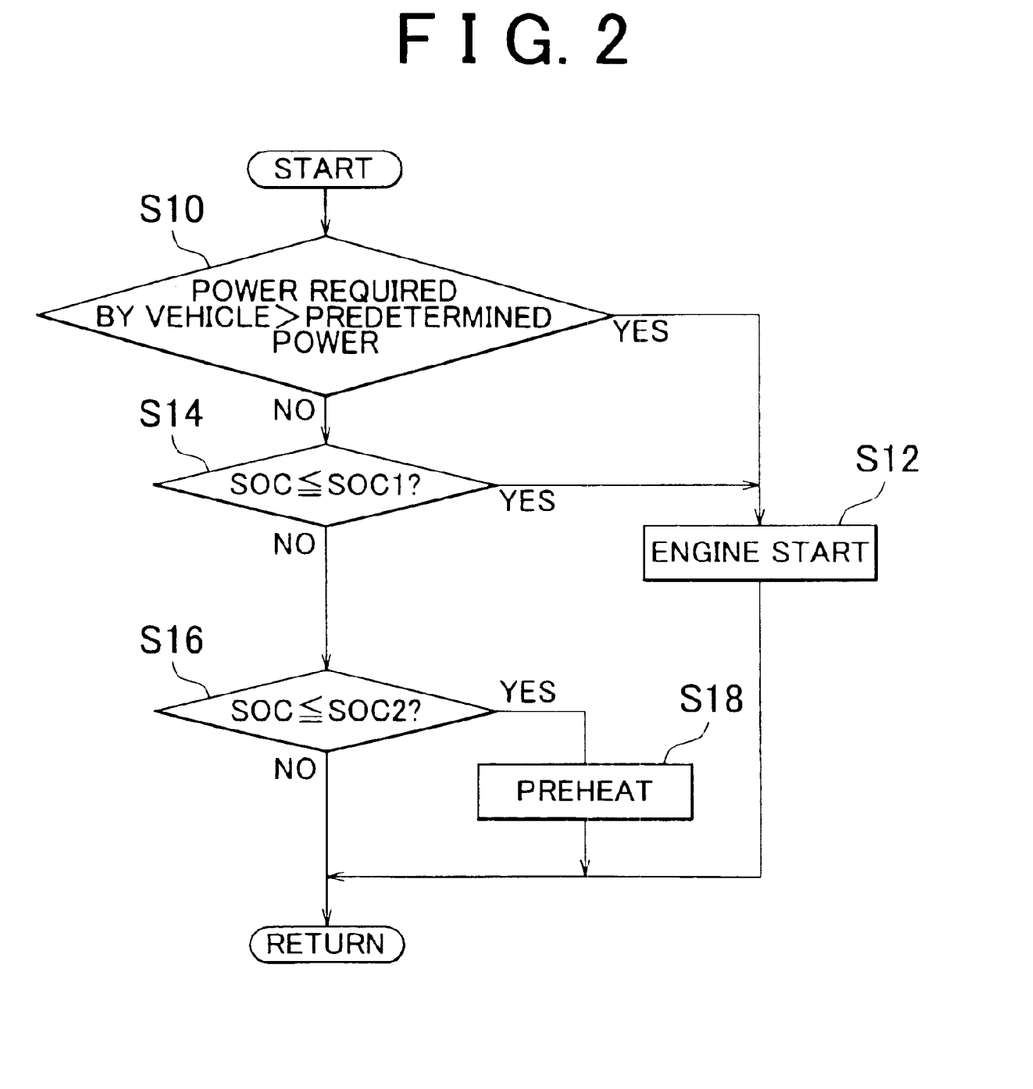
FIG. 2 is a flowchart showing an operation of the vehicle control device shown in FIG. 1.

FIG. 2 is a flowchart showing an operation of the vehicle control device 1 according to the embodiment. The control process shown in FIG. 2 is performed when the vehicle is running, for example, by a driving force of the motor 3

In Step 10 in the flowchart shown in FIG. 1, whether the power required by the vehicle is larger than a predetermined power is determined. The power required by the vehicle is the total power which is required by the entire vehicle. The power required by the vehicle is calculated by the hybrid ECU30 based on an accelerator opening, a vehicle speed, an amount of the electric power required to be generated by the generator 9 and the like. The predetermined power is a set value which is preset in the hybrid ECU30, and a power value at which the engine 2 needs to be driven is set as the predetermined power.

When it is determined in Step S10 that the engine 2 needs to be driven since the power required by the vehicle is larger than the predetermined power, the control process proceeds to Step S12 and the engine 2 is started. The engine 2 is started when the engine ECU 20 drives the engine 2 according to a driving request signal which is output from the hybrid ECU 30 to the engine ECU20.

Meanwhile, when it is determined in Step S10 that the power required by the vehicle is not larger than the predetermined power, the control process proceeds to Step S14. Then, whether the SOC (the amount of stored electric power, the amount of charged electric power) of the battery 5 is equal to or smaller than the lower limit SOC1 is determined.

The SOC of the battery 5 is detected based on, for example, an output from a current sensor (not shown) which is provided in a connecting portion of the battery 5 to the inverter 10, or a voltage of the electric power stored in the battery 5. The lower limit SOC1 is a set value which is preset in the hybrid ECU30, and is set as a lower limit for using the battery 5.

When it is determined in Step S14 that the SOC of the battery 5 is equal to or lower than the lower limit SOC1, the engine 2 is started. Meanwhile, when it is determined in Step S14 that the SOC of the battery 5 is not equal to or smaller than the lower limit SOC1, the control process proceeds to Step S16, and whether the SOC of the battery 5 is equal to or smaller than the set value SOC 2 is determined. The set value SOC2 is a set value which is preset in the hybrid ECU30, and is set as an amount of stored electric power which is larger than the lower limit SOC1.

When it is determined in Step S16 that the SOC of the battery 5 is not equal to or smaller than the set value SOC2, the control process ends since the battery 5 need not be charged. Meanwhile when it is determined in Step S16 that the SOC of the battery 5 is equal to or smaller than the set value SOC2, the control process proceeds to Step S18 and preheating is performed. Preheating is a process in which at least the engine 2 is heated. It is preferrable to heat the catalyst 53 and the oxygen sensor 55 they operate stably in a high temperature, as well as the engine 2.

The above-mentioned preheating is performed when a heating signal is output from the hybrid ECU30. The heating signal is output to the heater 51, the heater 54, and the oxygen sensor 55 through the engine ECU20. Thus, the heater 51, the heater 54, and the heater of the oxygen sensor 55 generate heat, and the engine 2, the catalyst 53 and the oxygen sensor 55 are heated, afterwhich the control process ends.

Figure 3:
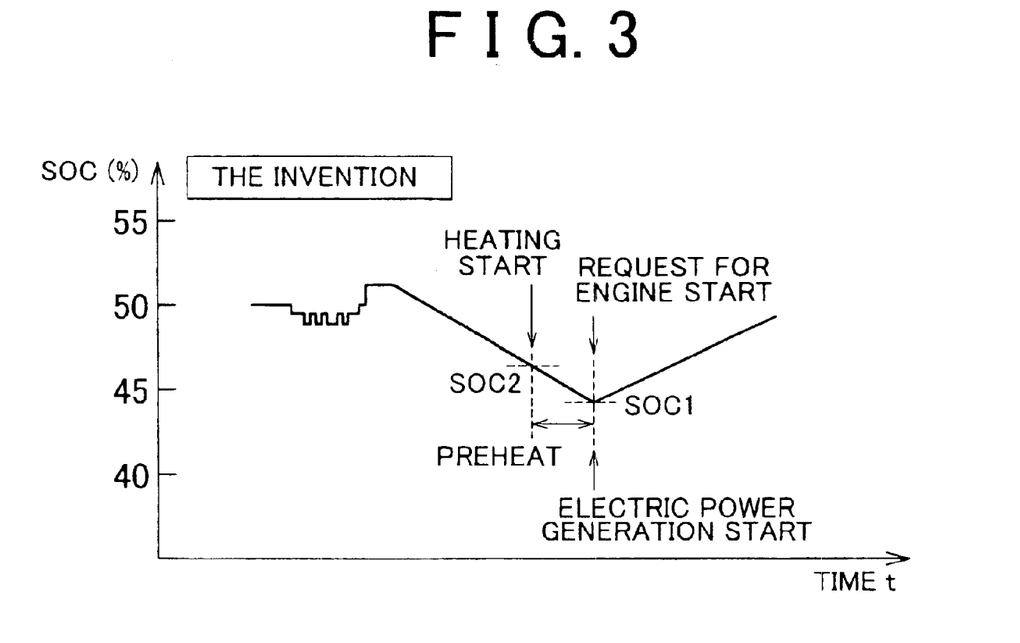
FIG. 3 is a diagram showing an SOC variation in a vehicle control device shown in FIG. 1 when the vehicle is running by driving a motor.
Figure 4:
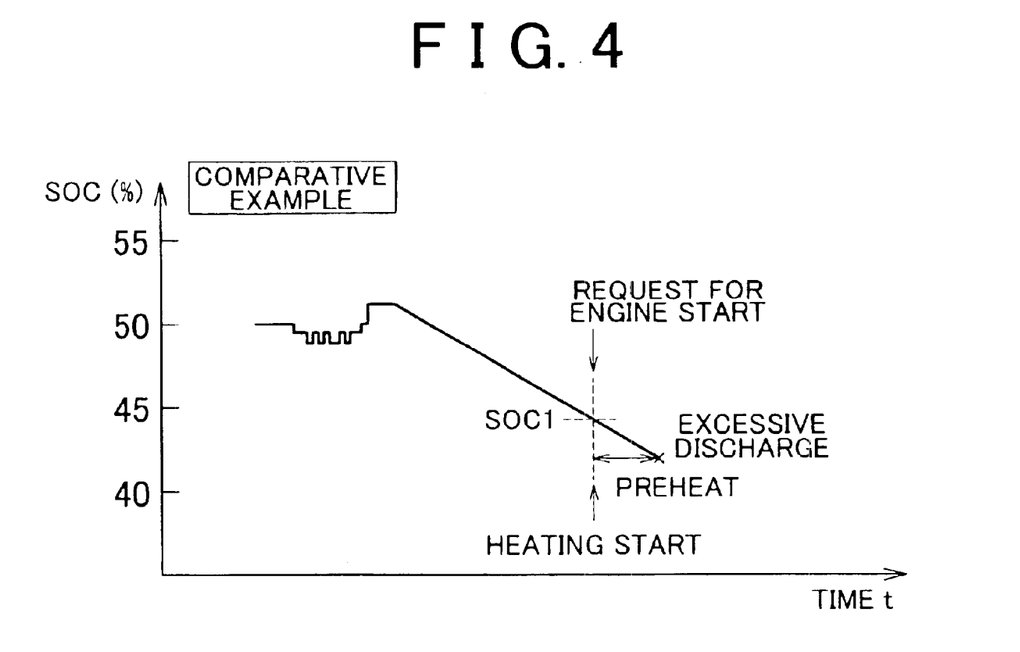
FIG. 4 is a diagram showing a SOC variation in a comparative example (related art) when the vehicle is running by driving the motor.

FIG. 3 shows a variation of the battery SOC in the vehicle control device according to the embodiment. FIG. 4 shows a variation of the battery SOC in a comparative example.

As shown in FIG. 3, in the vehicle control device according to the embodiment, when the vehicle is running by a driving force of the motor 3, the SOC of the battery 5 is gradually decreased. Then, when the SOC of the battery 5 becomes equal to the set value SOC2, heating (preheating) by the heater 51 and the like is started. Thus, the engine 2, the catalyst 53 and the like are heated and warmed before the engine 2 is started.

At this time, the set value SOC2 is set such that the preheating time is in a range of 5 seconds to 30 seconds. Preferably, the preheating time is set in a range of 5 seconds to 15 seconds. This SOC2 may be a fixed value. However, it is preferrable that the SOC2 be set as a function of variation ΔSOC of the SOC per unit time. In this case, dispersion of the preheating time can be suppressed, and required preheating can be performed reliably and efficiently.

Then, when the SOC of the battery 5 becomes equal to the lower limit SOC1, the engine 2 is started, and electric power is generated by a driving force of the engine 2. At this time, the engine 2 has already been warmed and the catalyst 53 is already activated by preheating. Accordingly, even when the engine 2 is driven, deterioration of the emission can be prevented. Also, when the SOC of the battery 5 becomes equal to the lower limit SOC1, the engine 2 can be immediately started, which avoids a state in which the vehicle becomes unable to run due to excessive discharge of the battery 5. Then, the battery 5 is charged with generated electric power, and the SOC is increased and recovered.

In contrast to this, as shown in FIG. 4, in an comparative example (related art), when the SOC of the battery 5 is gradually decreased because the vehicle runs by driving a motor, and the SOC of the battery 5 becomes equal to the lower limit SOC1, heating (preheating) by the heater 51, and the like is started. At this time, since the engine 2, the catalyst 53 and the like are cold, the engine 2 cannot be started.

Namely, the engine 2 is started after the completion of preheating. Accordingly, since the SOC of the battery 5 continues to be decreased during preheating, there is a possibility that the battery is over-discharged and the vehicle becomes unable to run. Alternatively, when the engine 2 is started before the completion of preheating when the engine has not been warmed, the emission may deteriorate.

As mentioned above, according to the vehicle control device 1 according to the embodiment, the engine 2, the catalyst 53, and the oxygen sensor 55 are preheated before the engine 2 is driven so as to charge the battery 5. Accordingly, when the engine 2 is started so as to charge the battery 5, the engine 2 has already been warmed, which prevents the occurrence of trouble such as deterioration of emission from. Also, when electric power is generated by driving the engine 2, it is not necessary to delay driving the engine 2 for warming the engine 2. Therefore, the battery 5 can be charged promptly as required, and a state in which the vehicle becomes unable to run due to excessive discharge of the battery 5 can be avoided. Accordingly, when the amount of the electric power stored in the battery 5 is decreased, the vehicle can run properly.

(Second Embodiment)

Next, a vehicle control device according to a second embodiment of the invention will be explained.

The vehicle control device according to the embodiment preheats at least the engine 2 in the case where preheating is started under the condition that a variation amount per unit time ΔSOC in the electric power stored in the battery 5 is equal to or larger than the preset set value ΔSOC3.

A configuration of hardware of the vehicle control device according to the embodiment is the same as that of the vehicle control device according to the first embodiment shown in FIG. 1.

Figure 5:
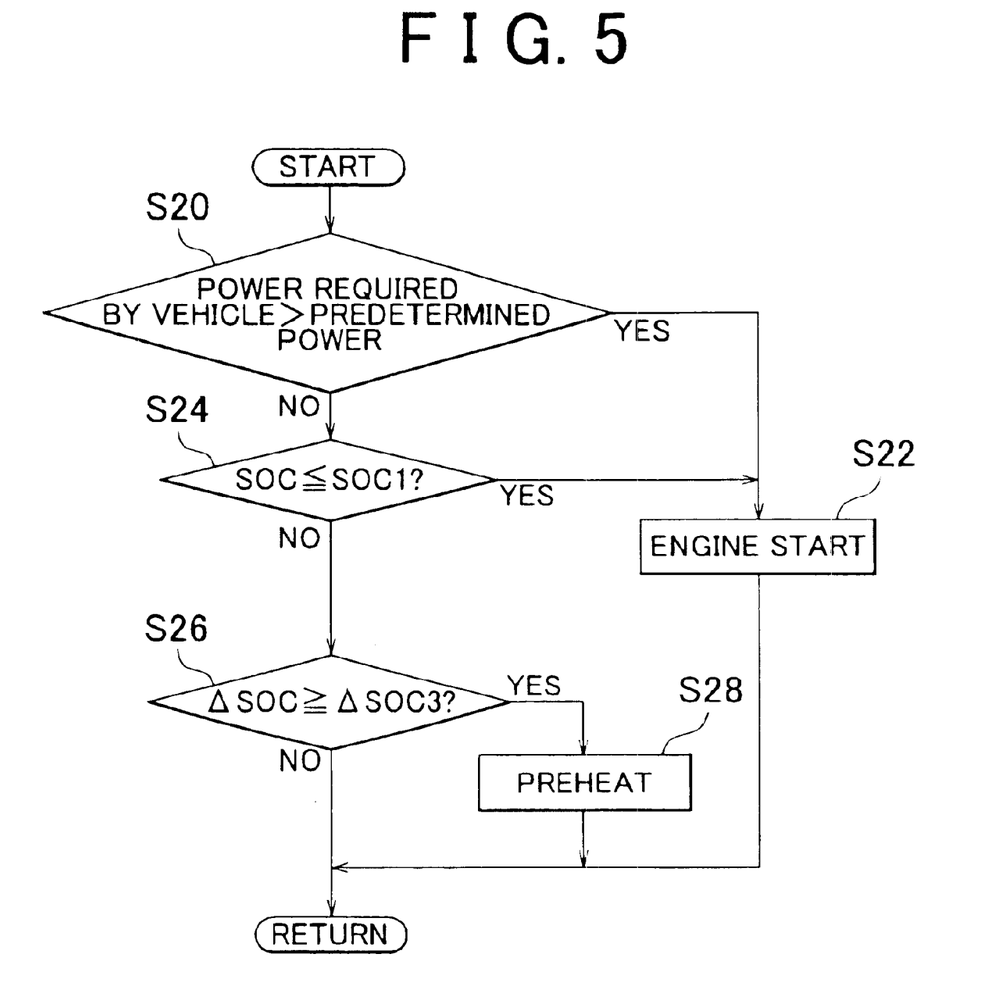
FIG. 5 is a flowchart showing an operation of a vehicle control device according to a second embodiment of the invention.

FIG. 5 is a flowchart showing the operation of the vehicle control device according to the embodiment. The control process shown in FIG. 5 is performed when the vehicle is running, for example, by a driving force of the motor 3.

As shown in Step S20 in FIG. 5, whether the power required by the vehicle is larger than the predetermined power is determined. When it is determined that the power required by the vehicle is larger than the predetermined power, and the engine 2 needs to be driven, the engine 2 is started (Step S22). Meanwhile, when it is determined in Step S20 that the power required by the vehicle is not larger than the predetermined power, whether the SOC of the battery 5 is equal to or smaller than the lower limit SOC1 is determined (Step S24). When it is determined that the SOC of the battery 5 is equal to or smaller than the lower limit SOC 1, the engine 2 is started (Step S22). Meanwhile, when it is determined that the SOC of the battery 5 is not smaller than the lower limit SOC1, the control process proceeds to Step S26, and whether the variation amount per unit time ΔSOC in the electric power stored in the battery 5 is equal to or larger than a set value ΔSOG3 is determined. The set value ΔSOC3 is a set value which is preset in the hybrid ECU30, and is set in consideration of, for example, the preheating time.

When it is determined in Step S26 that the variation amount per unit time ΔSOC in the electric power stored in the battery 5 is not equal to or larger than the set value ΔSOC3, the control process ends. Meanwhile, when it is determined that the variation amount per unit time ΔSOC in the electric power stored in the battery 5 is equal to or larger than the set value ΔSOC3, preheating is performed (Step S28), afterwhich the control process ends.

Note that processes in Steps S20 to S24 shown in FIG. 5 are performed in the same manner as the processes in Steps S10 to S14 shown in FIG. 1. Also, the preheating step in Step S28 shown in FIG. 5 is performed in the same manner as the preheating step in Step S18 shown in FIG. 1.

According to the vehicle control device according to the embodiment, the same action and effect as the vehicle control device according to the first embodiment can be obtained. Namely, since the engine 2, the catalyst 53 and the oxygen sensor 55 are preheated before the battery 5 is charged by driving the engine 2, the engine 2 has already been warmed when the engine 2 is started so as to charge the battery 5, which prevents the occurrence of trouble such as deterioration of emission. Also, when the engine 2 is driven to generate electric power, it is not necessary to delay driving the engine 2 for warming the engine 2. Accordingly, the battery 5 is charged promptly as required, and a state in which the vehicle becomes unable to run due to excessive discharge of the battery 5 can be avoided. Thus, when the amount of the electric power stored in the battery 5 is decreased, the vehicle can run properly.

As mentioned above, according to the invention, when the amount of the electric power stored in the battery is decreased, the vehicle can run properly.

What is claimed is:

1. A vehicle control device installed in a vehicle which includes an internal combustion engine and an electric motor and which runs by a driving force of at least one of the internal combustion engine and the electric motor, comprising:
    an electric power storing portion that supplies electric power to the electric motor;
    a control portion that charges the electric power storing portion by starting the internal combustion engine after the internal combustion engine is preheated when an amount of the electric power stored in the electric power storing portion becomes below a lower limit for use of the amount of the electric power; and
    a heating portion that preheats the internal combustion engine when the amount of the electric power stored in the electric power storing portion becomes equal to or lower than a set value that is set as an amount of the stored electric power larger than the lower limit for use of the amount of the stored electric power.

2. The vehicle control device according to claim 1, further comprising:
    a catalyst which is provided in an exhaust passage of the internal combustion engine, and which purifies an exhaust gas exhausted from the internal combustion engine, wherein:
    the heating portion preheats the catalyst as well as the internal combustion engine.

3. The vehicle control device according to claim 1, further comprising:
    a sensor detecting a parameter concerning about the internal combustion engine which is operated stably in a high temperature, wherein:
    the heating portion preheats the sensor as well as the internal combustion engine.

4. The vehicle control device according to claim 3, wherein:
    the sensor is an oxygen sensor which detects an oxygen concentration in an exhaust gas exhausted from the internal combustion engine.

5. A vehicle control device which is provided in a vehicle that includes an internal combustion engine and an electric motor and which runs by a driving force of at least one of the internal combustion engine and the electric motor, comprising:
    an electric power storing portion that supplies electric power to the electric motor;
    a control portion that charges the electric power storing portion by starting the internal combustion engine after the internal combustion engine is preheated when an amount of the electric power stored in an electric power storing portion becomes below a lower limit for use of the amount of the electric power; and
    a heating means for preheating the internal combustion engine when a variation amount per unit time in the electric power stored in the electric power storing portion becomes equal to or larger than a predetermined value.

6. The vehicle control device according to claim 5, further comprising:
    a catalyst which is provided in an exhaust passage of the internal combustion engine and which purifies an exhaust gas in the internal combustion engine, wherein the heating portion preheats the catalyst as well as the internal combustion engine.

7. The vehicle control device according to claim 5, further comprising:
    a sensor detecting a parameter concerning about the internal combustion engine which is operated stably in a high temperature, wherein:
    the heating portion preheats the sensor as well as the internal combustion engine.

8. The vehicle control device according to claim 7, wherein the sensor is an oxygen sensor which detects an oxygen concentration in an exhaust gas exhausted from the internal combustion engine.

9. A control method of a vehicle control device installed in a vehicle which includes an internal combustion engine and an electric motor and which runs by a driving force of at least one of the internal combustion engine and the electric motor comprising:
    preheating the internal combustion engine when an amount of electric power stored in an electric power storing portion which supplies the electric power to the electric motor becomes equal to or lower than a set value that is set as an amount of stored electric power larger than a lower limit for use of the amount of stored electric power, and charging the electric power storing portion by starting the internal combustion engine after the internal combustion engine is preheated.

10. The control method according to claim 9, wherein:

a catalyst which is provided in an exhaust passage of the internal combustion engine and which purifies an exhaust gas exhausted from the internal combustion engine is preheated as well as the internal combustion engine.

11. The control method according to claim 9, wherein:

a sensor detecting a parameter concerning about the internal combustion engine which is operated stably in a high temperature, is preheated as well as the internal combustion engine.

12. The control method according to claim 11, wherein the sensor is an oxygen sensor which detects an oxygen concentration in an exhaust gas exhausted from the internal combustion engine.

13. A control method of a vehicle control device installed in a vehicle which includes an internal combustion engine and an electric motor and which runs by a driving force of at least one of the internal combustion engine and the electric motor comprising:

preheating the internal combustion engine when a variation amount per unit time in the electric power stored in the electric power storing portion which supplies electric power to the electric motor becomes equal to or larger than a preset set value, and charging the electric power storing portion by starting the internal combustion engine after the internal combustion engine is preheated.

14. The control method according to claim 13, wherein:

a catalyst which is provided in an exhaust passage of the internal combustion engine and which purifies an exhaust gas in the internal combustion engine is preheated as well as the internal combustion engine.

15. The control method according to claim 13, wherein:

a sensor detecting a parameter concerning about the internal combustion engine which is operated stably in a high temperature, is preheated as well as the internal combustion engine.

16. The control method according to claim 15, wherein:

the sensor is an oxygen sensor which detects an oxygen concentration in an exhaust gas exhausted from the internal combustion engine.

* * * * *